United States Patent
Jhunjhunwala et al.

(10) Patent No.: US 10,108,473 B2
(45) Date of Patent: Oct. 23, 2018

(54) SYSTEM AND METHOD FOR AUTOMATIC ERROR CLASSIFICATION IN INTEGRATION SYSTEMS

(71) Applicant: Oracle International Corporation, Redwood Shores, CA (US)

(72) Inventors: Amit Jhunjhunwala, Bangalore (IN); Satish Duggana, Bangalore (IN); Srimant Misra, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 141 days.

(21) Appl. No.: 14/743,492

(22) Filed: Jun. 18, 2015

(65) Prior Publication Data

US 2016/0371133 A1    Dec. 22, 2016

(51) Int. Cl.
*G06F 11/07* (2006.01)
(52) U.S. Cl.
CPC ...... *G06F 11/0769* (2013.01); *G06F 11/0709* (2013.01); *G06F 11/0781* (2013.01); *G06F 11/0766* (2013.01)
(58) Field of Classification Search
CPC ............. G06F 11/0766; G06F 11/0769; G06F 11/0781; G06F 11/07
See application file for complete search history.

(56) References Cited

U.S. PATENT DOCUMENTS

| | | | |
|---|---|---|---|
| 6,662,089 B2 | 12/2003 | Felke et al. | |
| 7,124,060 B1 | 10/2006 | Eriksson et al. | |
| 7,379,799 B2 | 5/2008 | Cleary et al. | |
| 7,475,150 B2 | 1/2009 | Grabarnik et al. | |
| 7,689,872 B2 | 3/2010 | Doyle et al. | |
| 8,117,534 B1* | 2/2012 | Hattiangadi | G06F 11/0766 715/234 |
| 2005/0166099 A1* | 7/2005 | Shyu | G06F 11/0709 714/47.1 |
| 2007/0028220 A1 | 2/2007 | Miller et al. | |

(Continued)

OTHER PUBLICATIONS

Bronevetsky, et al. "Automatic Fault Characterization via Abnormality-Enhanced Classificiation", 42nd Annual IEEE/IFIP International Conference on Dependable Systems and Networks, Jun. 25-28, 2012, 12 pages.

(Continued)

*Primary Examiner* — Joseph O Schell (74) *Attorney, Agent, or Firm* — Tucker Ellis LLP (57) ABSTRACT

A system and method for error classification in an integration system. The system and method can receive a request to begin a transaction at the integration system. Additionally, the system and method can invoke an application associated with the request. In response to invoking the application, the system and method can receive a formatted error notification, the formatted error notification comprising at least one of a plurality of error formats. Additionally, the system and method can extract an error message text from the formatted error notification, resulting in a plain text of the formatted error notification. The system and method can also classify, at the error classifier, the formatted error notification based at least on training data and the plain text of the formatted error notification.

20 Claims, 6 Drawing Sheets

(56) References Cited

U.S. PATENT DOCUMENTS

| | | | | |
|---|---|---|---|---|
| 2011/0060946 A1* | 3/2011 | Gupta | ............... | G06F 11/0709 |
| | | | | 714/26 |
| 2011/0302192 A1* | 12/2011 | Bariska, Jr. | ........... | G06F 11/079 |
| | | | | 707/769 |
| 2013/0013953 A1* | 1/2013 | Eck | ................ | G06F 9/45545 |
| | | | | 714/2 |
| 2014/0129536 A1* | 5/2014 | Anand | ............... | G06Q 10/0635 |
| | | | | 707/706 |

OTHER PUBLICATIONS

Desai, et al. "BPEL fault handling in WebSphere Integration Developer and WebSphere Process Server", Apr. 25, 2007, 12 pages.

"Error Handling", http://www.mulesoft.org/documentation/display/current/Error+Handling, 4 pages, retrieved on Feb. 5, 2015.

Fuad, et al. "Self-Healing by Means of Runtime Execution Profiling", 14th International Conference on Computer and Information Technology, Dec. 22-24, 2011, 6 pages.

Lee, Young K., "A Fault Diagnosis Technique for Complex Systems Using Bayesian Data Analysis", Georgia Institute of Technology, Apr. 2008, 184 pages.

"Using Boomi AtomSphere", http://www.boomi.com/integration/using_atomsphere, 5 pages, retrieved on Feb. 5, 2015.

\* cited by examiner

SYSTEM AND METHOD FOR AUTOMATIC ERROR CLASSIFICATION IN INTEGRATION SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and more particularly to the error classification in an integrated system.

BACKGROUND

An integrated system product, such as a Service-Oriented Architecture (SOA) system, can, in the course of operation, call multiple and complex services, applications and systems as part of an integration flow. These complex integration flows often require elaborate error handling in order to effectively handle faults and errors that arise during operation and runtime. A beneficial step in the effective handling and processing of faults and errors is the classification of these faults and errors.

Existing error classifiers depend on static information in order to classify errors and faults. Some current classifiers depend on a Web Services Description Language (WSDL) fault to map WSDL faults to application errors, and may also look at hypertext transfer protocol (HTTP) for representational state transfer (REST) requests. Other classifiers may take a static list of error codes from an application administrator, and then classify the error based thereon. Yet other classifiers may put all connection errors in a system error classification. A problem arises as the formats that errors are reported in are quite diverse (e.g., REST, SOAP, JSON, CSV . . . etc.). Because of this diversity among error reporting formats, it is impractical for any administrator to supply a sufficiently large amount of static information for an error classifier to be effective across all error formats. Additionally, error messages may be under multiple layers, rendering traditional error classifiers unable to perform.

SUMMARY

Described herein are systems and methods for automatic error classification in an integration system. In an embodiment, the systems and method can receive a request to being a transaction at the integration system. The systems and methods can continue with invoking an application associated with the request. In response to invoking the application, the systems and method can continue with receiving a formatted error notification, the formatted error notification comprising one of a plurality of error formats. The systems and methods can proceed with extracting an error message text from the formatted error notification, resulting in a plain text of the formatted error notification. The systems and methods can continue with classifying, at an error classifier, the formatted error notification based at least on training data and the plain text of the formatted error notification.

DETAILED DESCRIPTION

In the following detailed description, the invention will be illustrated by way of example and not by way of limitation in the figures of the accompanying drawings. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configures may be used without departing form the scope and spirit of the invention.

Common reference numerals are used to indicate like elements throughout the drawings and detailed description; therefore, reference numerals used in a figure may or may not be referenced in the detailed description specific to such figure if the element is described elsewhere.

Described herein are systems and methods that allow for the automatic error classification in integration systems. In an embodiment, the present disclosure includes the classification of, at least, both system and application errors, and allows for the automatic classification of such errors into categories, including recoverable and non-recoverable errors. The systems and methods also allow for a dashboard or user interface by which an administrator is able to look at errors that cannot be automatically classified and provide a classification. The systems and methods are not tied to static error classifications, and allow for dynamic creation of error classifications on the fly. The systems and methods herein are particularly useful for integration scenarios where an end system or application is unknown, and thus the corresponding errors from the end system or application are likewise unknown.

In accordance with an embodiment, integration flow requires elaborate error handling as the integration system is required to pull together various and diverse subsystems into a working system. In order to achieve effective error handling, proper error classification based upon a received fault or error message can be necessary. Because of the complex nature of integration systems, error or fault messages can be wrapped inside multiple layers, leaving integration systems clueless about classifying the errors. Effective error classification leads to more effective integration flow within integration systems.

The disclosure that follows uses the Oracle™ Service-Oriented Architecture (also variously referred to herein as "SOA") as an example for an integration flow service and system within which the present disclosure can be practiced. It will be apparent to those skilled in the art that other types of integration flow services and systems, as well as other middleware environments, can be used with this disclosure without limitation. Generally, an integration system is a system that brings together component subsystems into one integrated system and ensures that the subsystems function together as a system.

Example Environment

Figure 1:
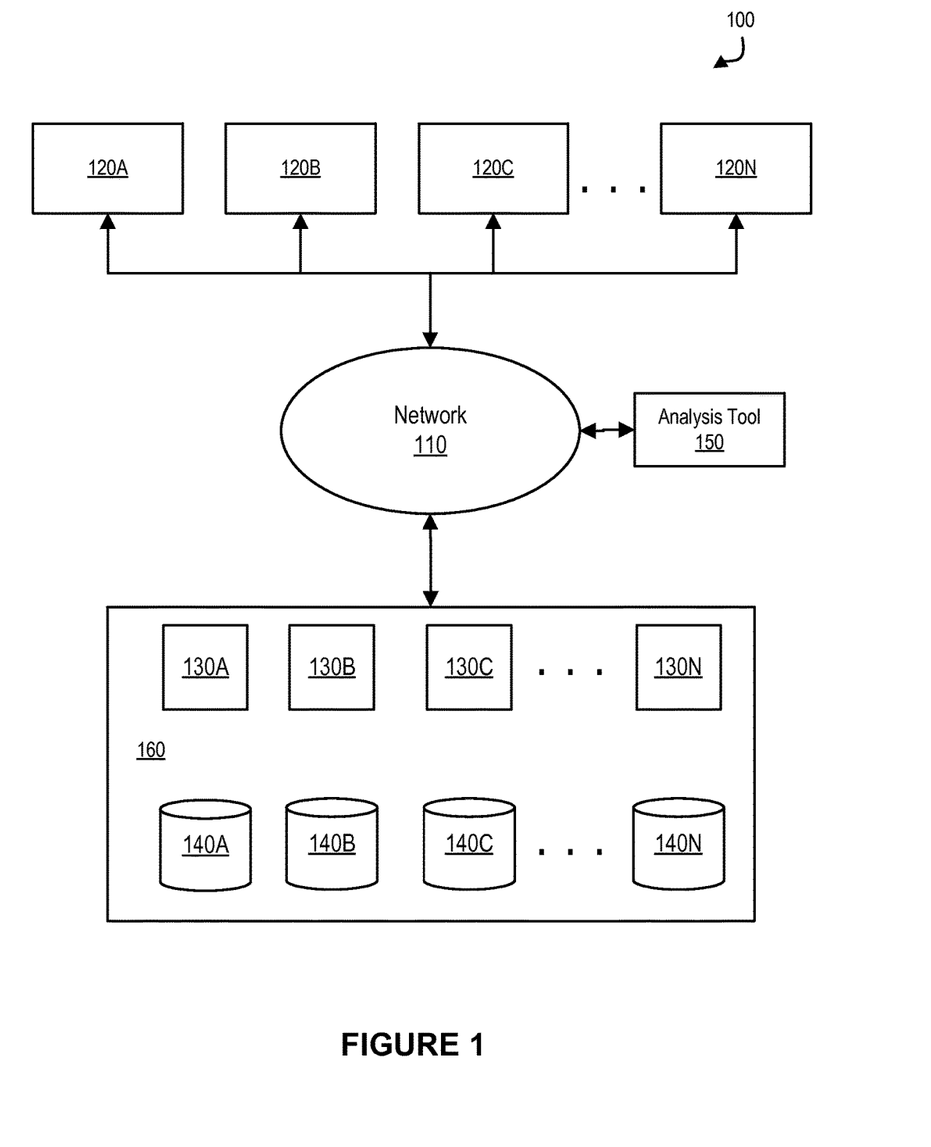
FIG. 1 is a block diagram illustrating an example environment in which aspects of the present disclosure can be implemented.

FIG. 1 is a block diagram illustrating an example environment 100 (e.g., computing system, network computing system, cloud computing system . . . etc.) in which aspects of the present disclosure can be implemented. The block diagram is shown containing user systems 120A through 120N, network 110, analysis tool 150, server systems 130A-130N and data stores 140A-140N.

FIG. 1 is an exemplary system, showing an illustrative number of components of exemplary environment 100. Other environments in which aspects of the present disclosure can be implemented may contain more or fewer systems, both in number and type, depending on the purpose for which the environment was designed. The aspects of FIG. 1 are described below in more detail.

A network 110 provides connectivity between user systems 120A-120N, analysis tool 150, server systems 130A-130N, and data stores 140A-140N. In certain situations, the server systems 130A-130N and data stores 140A-140N are included within system 160. Network 110 can be implemented through protocols such as Transmission Control Protocol (TCP) and/or Internet Protocol (IP) (also referred to herein as TCP/IP). Generally, in TCP/IP environments, an IP packet is used as a basic unit of transport, with the source address being set to the IP address assigned to the source system from which the packet originates, and the destination address set to the IP address of the target system to which the packet is to be eventually delivered. An IP packet is directed to a target system when the destination IP address of the packet is set to the IP address of the target system, such that the packet is eventually delivered to the target system by network 110.

In an embodiment, each of user systems 120A-120N represents a system such as a personal computer, workstation, mobile device (e.g., cell phone, smart phone), client device, etc., used by users to generate requests for invocation of services to the provider systems providing the services, such as server systems 130A-130N. The requests are generated using appropriate user interfaces. Generally, a user system sends requests invoking services for performing specific tasks and receives, as corresponding responses, the results of performance of the requested tasks. Each request is sent in the form of an IP packet directed to the desired server system, which provides the service. The IP packet includes data identifying the requested SOA service in the payload portion.

Each of data stores 140A-140N is, in an embodiment, a non-volatile (persistent) storage facilitating storage and retrieval of a collection of data by applications executing in server systems 130A-130N. Some of data stores 140A-140N is implemented as a corresponding database server using relational database technologies and accordingly providing storage and retrieval of data using structured queries such as SQL (Structured Query Language). Some of data stores 140A-140N is implemented as a corresponding file server providing storage and retrieval of data in the form of files organized as one or more directories, as is well known in the relevant arts.

In an embodiment, each of server systems 130A-130N represents a server, such as a web/application server, or a WebLogic Server (WLS), capable of providing services, such as SOA services, to users using user systems 120A-120N. Generally, a server system receives a request invoking a service for performing a desired task from one of user systems 120A-120N, performs the tasks on data maintained internally or on external data (for example, stored in data stores 140A-140N) and then sends the result of performance of the tasks to the requesting user system as a corresponding response to the invocation request.

In an embodiment, analysis tool 150 may provide automatic error classification to server systems 130A-130N in the event that a runtime results in an error or fault message. Although depicted in FIG. 1 as being communicatively coupled to server systems 130A-130N and system 160 through network 110, it is understood that analysis tool 150 can also be incorporated with each server systems 130A-130N, or, additionally or alternatively within system 160.

In some embodiments, the environment of FIG. 1 is a SOA environment, in which user systems 120A-120N may be viewed as consumer systems consuming SOA services and server systems 130A-130N may be viewed as provider systems (providing SOA services). Examples of such SOA services are enterprise service bus (ESB) services which facilitate routing of requests/responses between consumer and provider systems, business process execution language (BPEL) services used to orchestrate (perform together) one or more SOA services provided by the provider systems, etc.

In an embodiment, SOA services are implemented in the form of artifacts (in the provider systems). Each SOA artifact typically contains program logic implementing one or more of such services. An artifact is typically made available at a corresponding Uniform Resource Locator (URL), and the requests (sent by consumer systems) contain additional data to indicate the specific service in case more than one service is implemented by the artifact, as is well known in the relevant arts. A general SOA architecture is described in more detail in exemplary system depicted in FIG. 2.

Example SOA Architecture

Figure 2:
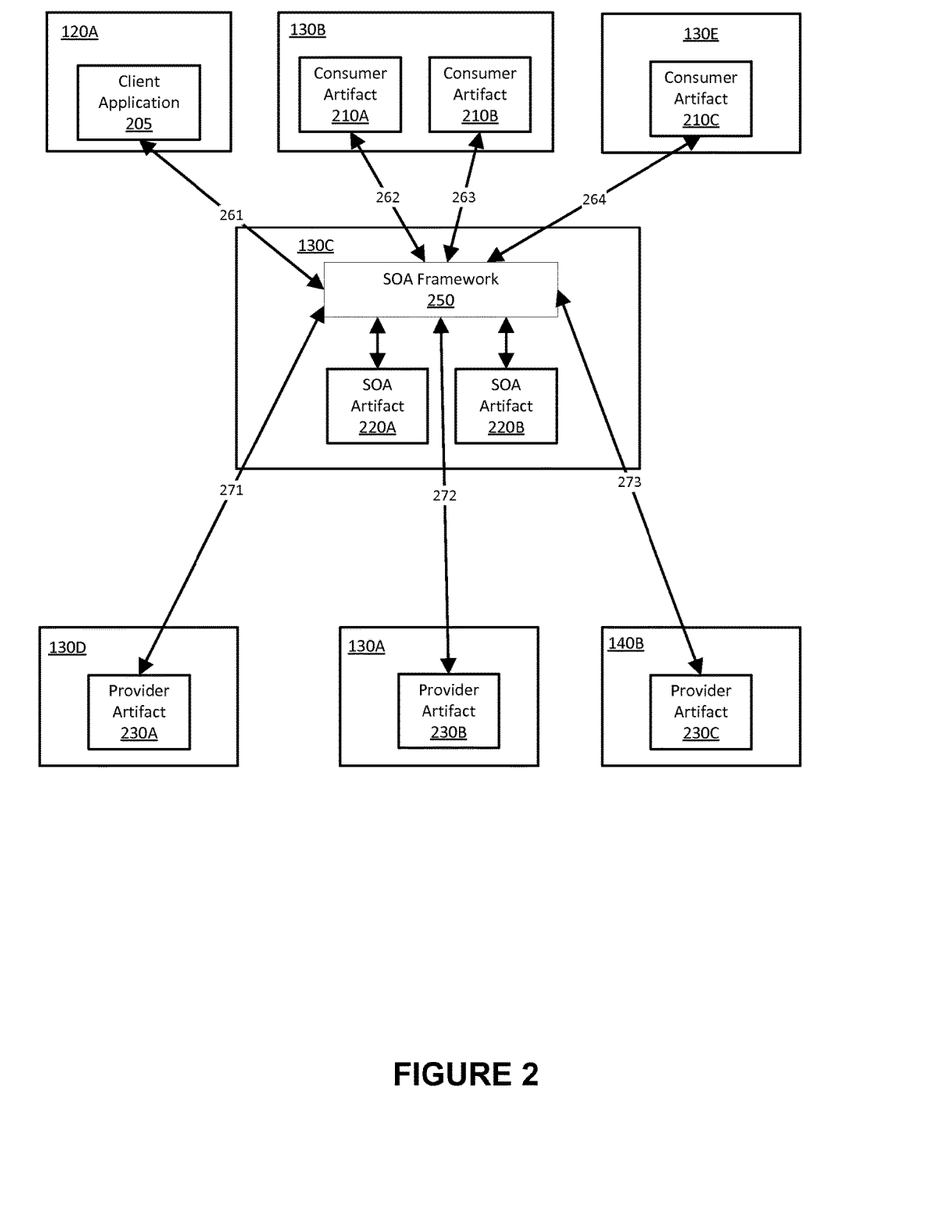
FIG. 2 is a block diagram illustrating the manner in which SOA services are provided, according to an embodiment.

FIG. 2 is a block diagram illustrating the manner in which SOA services are provided, according to an embodiment. The block diagram is shown containing the some of the structures and systems of FIG. 1 deployed with corresponding SOA related executable modules.

A client application 205, executing in user system 120A, sends a request for invoking a SOA service provided by server system 130C and receives a corresponding response (shown by two way interaction 261). The requests and responses can be conducted according to a contract (for example, specified in a WSDL) of the invoked SOA service. Consumer artifacts 210A-210B, which can represent applications executing in server system 130B, may also send requests for invoking SOA services provided by server 130C. The interactions between the SOA service and the Consumer Artifacts 210A and 210B are shown, respectively, by two way interactions 262 and 263.

SOA framework 250, executing in server system 130C, facilitates SOA artifacts, for example, SOA artifacts 220A and 220B, to be deployed and the corresponding SOA services to be provided to users via, for example, client application 205. SOA frameworks simplify programmer complexity by operating based on declarative statements, which merely need to indicate what SOA services are provided (by an artifact) and which SOA services (provided by same or other server systems) are to be invoked by a provided SOA service.

Thus, additional low level detail such as the manner of establishing connection to the other server systems, error handling, logging, type of details, need not be required to be specified by the programmers of the specific SOA services. In other words, such detail need not be present in the SOA artifacts representing the corresponding SOA services. An example product providing a SOA framework is "Oracle™ Application Server" available from Oracle™.

During run time, to process requests, SOA framework 250 examines declarations in the SOA artifacts (220A-220B) that are deployed to determine if any further services are to be invoked. Such invocation of further SOA services may be wanted, for example, when the provided SOA service is of type ESB service or BPEL service.

Although only shown as executing in one server system in FIG. 2 (i.e., server system 130C), in some embodiments, SOA framework may be executing on one or more of server systems (e.g., 130A-130N).

SOA framework 250 is shown invoking the services provided by provider artifacts 230A-230C (deployed respectively in server systems 130D, 130A, and data store 140B) based on the declarations in SOA artifacts 220A and 220B. SOA framework 250 also may receive the responses from the provider artifacts as shown by interactions 271-273 and can forward the responses to the consumers (such as client application 205). The services provided by provide artifacts 230A-230C may be one of, for example, adapter service, external service, routing service, abstract WSDL, BPEL service, and ESB service. Moreover, some of the provider artifacts (for example, 230B providing a BPEL/ESB service) may also operate as consumer artifacts.

Analysis tool 150 provides automatic error classification in the event that a runtime results in an error or fault message. For example, the runtime of Client Application 205 may result in an error or fault message being product. Analysis tool 150 communicates directly with SOA framework 250.

At least based on the general operation described above, it should be appreciated that complex SOA based environments can have a mesh of SOA services and corresponding artifacts, which are inter-dependent.

Training Error Classifier Model Before Runtime

As already discussed above, analysis tool 150 can provide automatic error classification in the event that a runtime results in an error or a fault message. In an embodiment, the analysis tool 150 contains an error classifier model.

Figure 3:
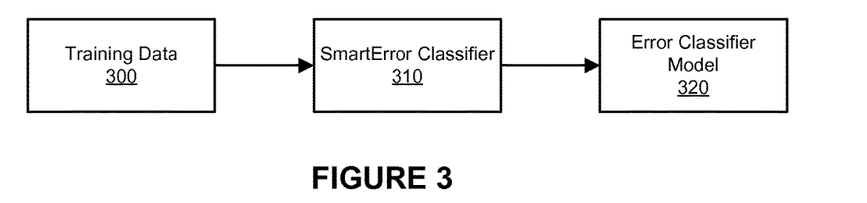
FIG. 3 is a block diagram illustrating a manner in which an Error Classifier Model is trained before runtime, according an embodiment of the invention.

Referring now to FIG. 3, which depicts a block diagram illustrating a manner in which an Error Classifier Model is trained before runtime, according an embodiment of the present disclosure. As is generally depicted in FIG. 3, according an embodiment of the present disclosure, training data 300 is generally provided to a SmartError Classifier 310.

In an embodiment of the present disclosure, the training data 300 that is provided to the SmartError Classifier 310 is training data that is associated with an initial and/or known error classification data. Additionally, the training data 300 can be provided to the SmartError Classifier 310 prior to runtime or during runtime. In an embodiment where the training data is provided to the SmartError Classifier 310 prior to runtime, the training data can include error classifications acquired during previous runtimes and/or error classifications obtained from static or dynamic libraries or indexes of error classifications. In an embodiment where the training data is provided to the SmartError Classifier 310 during runtime, the training data can include error classifications acquired dynamically through algorithms, such as machine learning algorithms, through rules, or through an administrator or other user with the proper credentials.

For example, in an embodiment, an Administrator, before runtime, specifies the training data 300 to be provided to the SmartError Classifier 310, and subsequently to the Error Classifier Model 320. This training data contains an index or listing of errors, as well as the corresponding classification of those errors (discussed in more detail in the following discussion of FIG. 5). In this example the training data 300 is used to train the system for classifying the errors which are received during runtime. In an embodiment, the training data 300 is contained in and/or specified via a text file document.

As a further example, in an embodiment, an Administrator, during runtime, provides training data 300 to the SmartError Classifier 310. In this embodiment, the SmartError Classifier 310 has obtained additional training data 300 prior to runtime. The training data 300 provided to the SmartError Classifier 310 during runtime by the Administrator is provided through a dashboard or user interface. This example takes place when the system encounters an error that was not included in the initial, pre-runtime training data 300. In such a situation, the system receives training data directly from the Administrator, which training data is then classified by the SmartError Classifier 310 and, subsequently, provided to the Error Classifier Model 320.

As an example, an Oracle™ SOA integration flow system receives a request from a user to initiate an application via the SOA integration flow system. In such a situation, during the call to initiate the application via the SOA integration flow system, the training data 300 associated with the application and the system upon which application runs or calls upon to run is generated and fed into the SmartError Classifier 310. Alternatively, the training data associated with the application and the system upon which application runs or calls upon to run may be selected by an administrator.

Training Error Classifier Model During Runtime

Figure 4:
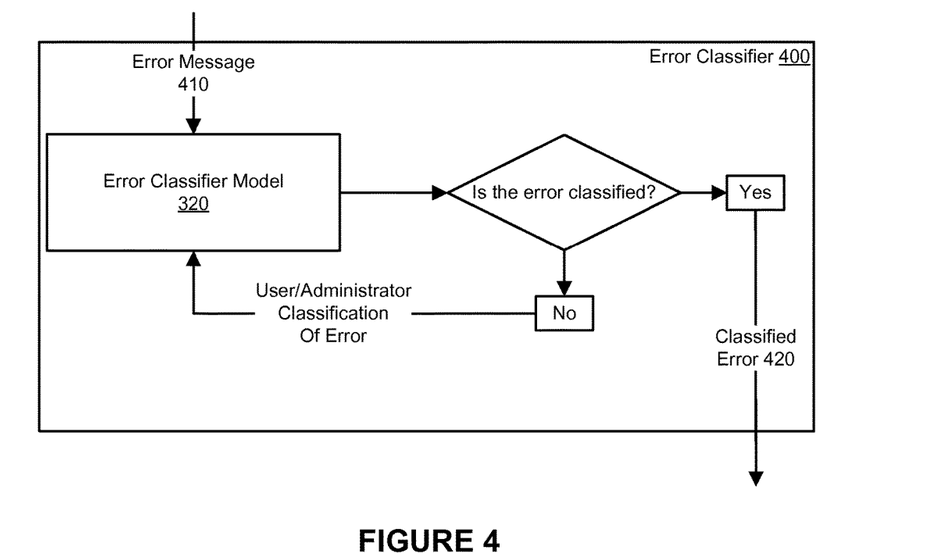
FIG. 4 is a block diagram illustrating a manner in which an Error Classifier Model is trained at runtime, according an embodiment of the invention.

Referring now to FIG. 4, which depicts a block diagram illustrating a manner in which an Error Classifier Model 320 is trained at runtime, according an embodiment of the present disclosure. During runtime, an error message 410 is provided to the Error Classifier 400, which then provides the error message to the Error Classifier Model 320. In an embodiment where the Error Classifier Model 320 does not recognize the error based upon its previous training, then the Error Classifier Model 320 is not able to classify the error message 410. In such situations, e.g., where the Error Classifier Model 320 encounters unknown errors (e.g., errors not contained in the initial training data the system received at time of deployment), the system allows for the administrator to classify the error through manual intervention. At the point of administrator intervention, the information submitted by the administrator is additionally provided as training data that is then provided to the Error Classifier 320 (see FIG. 3 for a further discussion). By providing the training data back to the Error Classifier Model 320, future classifications for similar errors can then be performed automatically.

As an example, an Oracle™ SOA integration flow system receives a request from a user to initiate an application via the SOA integration flow system. In such a situation, during the call to initiate the application via the SOA integration flow system, the training data 300 associated with the application and the system upon which application runs or calls upon to run can be generated and provided SmartError Classifier 310, which in turn then populates the Error Classifier Model 320. Alternatively, the training data associated with the application and the system upon which application runs or calls upon to run may be selected by an administrator. At runtime, for example, an application error is encountered. If the application error was not included the initial training data the Error Classifier Model 320 received at deployment, and is otherwise not recognized, then the system allows an administrator to classify the error. After receiving this manual error classification, the system can treat this classification as further training data which is provided to the Error Classifier Model 320.

As such, in some embodiments, there are at least two sources of training data that can comprise the Error Classifier Model 320, namely the initial training data provided to the Error Classifier Model 320, as well as training data received when an Administrator manually classifies an error.

Classification of Errors

Figure 5:
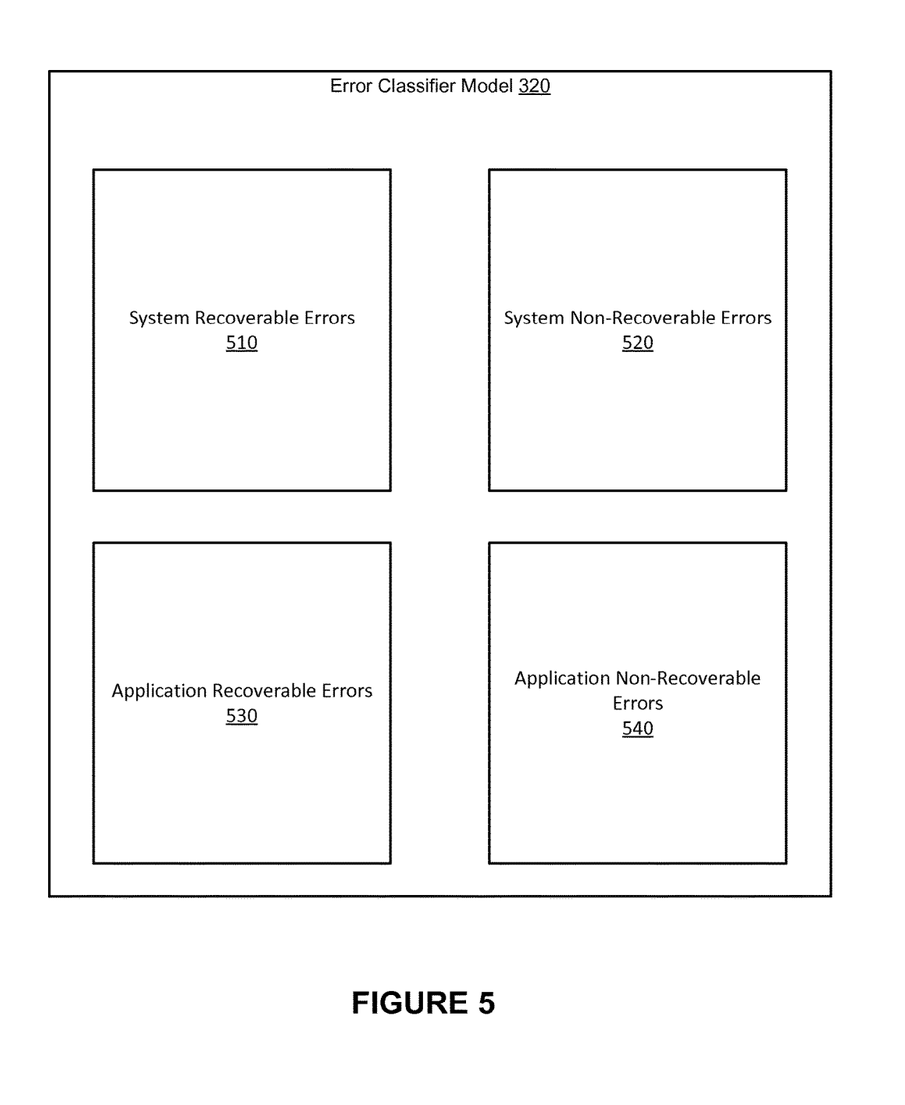
FIG. 5 is a block diagram of an error classification model, according to an embodiment of the invention.

Referring now to FIG. 5, which depicts a block diagram of an error classification model, according to an embodiment of the present disclosure. The Error Classifier Model 320, as depicted, shows that there are several different classifications of errors that may be defined within the Error Classification Model 320. It should be noted at the outset of this discussion that what is shown in FIG. 5 is only a representative listing of error classifications and should not be construed to represent the entirety of world of error classifications that are contemplated by the present disclosure.

In an embodiment, the Error Classification Model 320 can contain a plurality of error classifications that can, in turn, be mapped to training data. In the embodiment depicted in FIG. 5, there are two shown two general classifications of errors, and two sub-classifications of errors within each of the two general classifications. System errors, in an embodiment, represent errors which, in general, are caused by hardware failure, network failure, disk drive failure, disk drive capacity, intermittent unknown issues . . . etc. Application errors, in an embodiment, represent errors which, in general, are caused by application runtime faults (e.g., payment verification process failure).

In the embodiment depicted in FIG. 5, these two general classifications of errors, system and application errors, are further broken down into sub-classifications of recoverable errors and non-recoverable errors. In an embodiment, recoverable errors are those errors or faults that can be re-tried automatically or with the addition of some logic by the integration system (for example, an Oracle™ SOA). Conversely, non-recoverable errors are those errors or faults that need not be re-tried by the integration system.

FIG. 5 depicts four sub-categories of errors, these errors being System Recoverable Errors 510, System Non-Recoverable Errors 520, Application Recoverable Errors 530, and Application Non-Recoverable Errors 540. It should be apparent to one of skill in the art that these four sub-categories of errors serve only as a representative, as opposed an exhaustive, list of the types of errors that could be subjected to error classification, in certain embodiments of the instant disclosure.

Integration Flow with Error Classification

Figure 6:
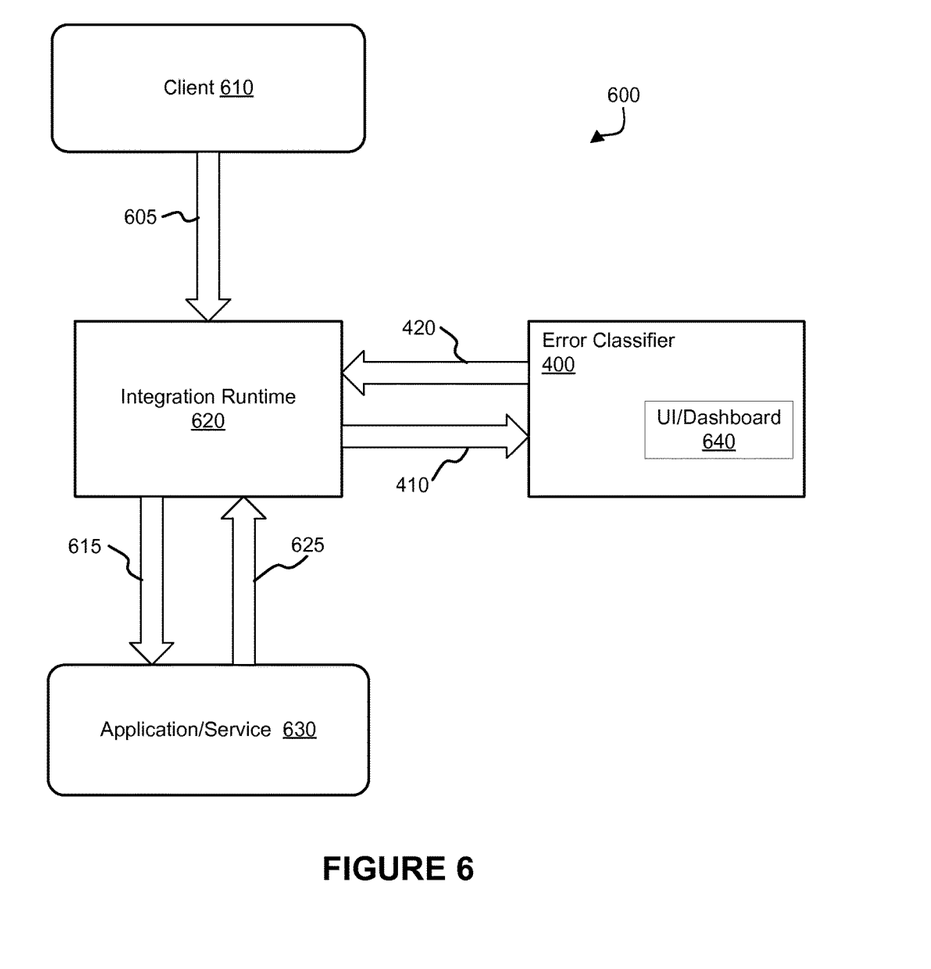
FIG. 6 is a block diagram showing an integration flow with error classification, according to an embodiment of the invention.

FIG. 6 depicts a block diagram showing an integration flow with error classification, according to an embodiment of the present disclosure. An integration flow 600 includes a client 610, an integration runtime module 620, and application and/or service, 630, and the aforementioned error classifier 400. In some embodiments, the error classifier may comprise a User Interface and/or Dashboard 640.

According to an embodiment, the integration flow 600 may begin when the client 610 requests 605 an application or service 630 through the integration runtime, and the integration runtime module 620 in turns calls to action 615 the requested application and/or service 630. For example, a user of Salesforce™ may call the Salesforce™ runtime through an integration runtime module 620, such as Oracle™ SOA. In such an embodiment, the user would represent client 610, Oracle™ SOA would represent the integration runtime module 620, and the user would represent the client 610.

After calling the application and/or service 630 to action through the integration runtime module 620, the application and/or service, upon the detection of a fault or error, notifies the integration runtime module 620 of the error and passes the error message 625. In an embodiment, the integration runtime module 620 can then pass 410 the error message to the error classifier.

In an embodiment, the error and/or fault messages that the application and/or service 630 passes to the integration runtime module 620 are generally in a format associated with the application, services, and/or system that were initially requested by the user. These formats include, but are not limited to, REST, SOAP, JSON, CSV . . . etc. Ordinarily, the number of error formats would present a problem to a traditional system as the training data and/or error classifier model (e.g., 320 from FIG. 3), wouldn't be able to decipher the error messages due to the different and unpredictable formatting. However, in embodiments of the present disclosure, the systems and methods, and more particularly the training data and the error classifier model, provided herein extract error message text from the formatted error message, resulting in a plain text file associated with the error messages. This presents the additional benefit of being able to ignore traditional problems associated with layered error messages (error messages that are further layered by other messages), as well as those problems encountered with error messages that have an unknown or untrained formatting, as the systems herein examine the associated text files, which are unformatted and un-layered.

As discussed above, the error classifier can contain at least one of training received before runtime (FIG. 3), and training received during prior runtimes (FIG. 4). Once the error message has been passed 410 to the error classifier 400, the error classifier 400 will automatically classify the error, either through comparing the plain text file of the error message with training data received by the error classifier model prior to deployment (see FIG. 3), or, if the error is unable to be classified by the training data currently contained in the error classifier model, then through manual intervention by an administrator or other authorized user via the User Interface/Dashboard 640 (see FIG. 4). Once the error has been classified, the error classifier will provide 420 the classification of the error to the integration runtime module, which can then take appropriate action (e.g., re-trying the application/system resource if the error is classified as a "recoverable error", such as system recoverable error 510 or application recoverable error 530).

Figure 7:
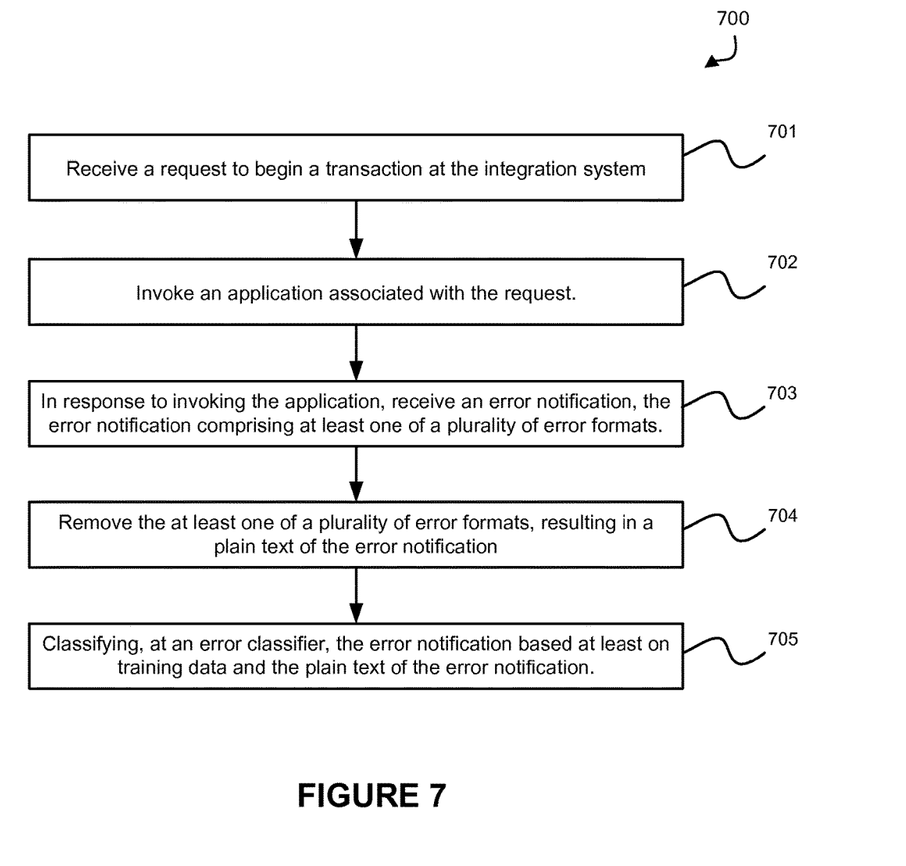
FIG. 7 is a flow chart for a method for error classification within an integration system, according to an embodiment of the invention.

FIG. 7 depicts, via a flow chart, an exemplary method 700 for error classification within an integration system. At step 701, the method begins with receiving a request to begin a transaction at the integration system. In an embodiment, for example, this could constitute the step of a user of an application attempting to process an online payment via a credit card authorization application. In this example, the received request could be, for example, received from an online merchant who is requesting a credit card authorization application system to be run through the integration system, for example, Oracle™ SOA.

At step 702, the exemplary method 700 continues with invoking the application associated with the request. In an embodiment, and continuing the example from the immediately preceding paragraph, this method step can be associated with the integration system requesting that the requested credit card authorization application be run, either locally or in a cloud, or in some other accessible environment.

At step 703, the exemplary method 700 can proceed with, in response to invoking the requested application, receiving a formatted error notification. In an embodiment, the formatted error notification comprises at least one of a plurality of error formats. Continuing the example of the preceding two paragraphs, the Oracle™ SOA system can receive a formatted error message from, for example, the credit card authorization application. The formatted error notification is received from the credit card authorization application when the application is unable to receive a confirmation from a bank associated with a customer's credit card. In an embodiment, the formatted error notification received may be in a certain error notification format, such as SOAP or JSON.

At step 704, the exemplary method 700 can continue with extracting an error message text from the formatted error notification, resulting in a plain text of the formatted error notification. By extracting the plain text of the formatted error notification, the result is a plain text of the formatted error notification. In continuing the example from the preceding three paragraphs, the formatted error notification received from the application can be in a format such as SOAP or JSON. The method continues with extracting an error message text from the formatted error notification such that a plain text file of the formatted error notification is remaining.

At step 705, the exemplary method can proceed with classifying, at an error classifier, the formatted error notification based at least on training data and the plain text of the formatted error notification. Continuing the example from the preceding four paragraphs, an error classifier can classify the formatted error notification based on the plain text file of the formatted error notification as well as training data.

As those of ordinary skill in the art will understand, the functions represented by the block diagram may be performed by software and/or hardware. Depending upon the particular processing strategy, such as event-driven, interrupt-driven, etc., the various functions may be performed in an order or sequence other than illustrated in the Figure. Similarly, one or more steps or functions may be repeatedly performed, although not explicitly illustrated. Likewise, various functions may be omitted depending on the particular implementation. Various functions known to those of skill in the art may not be explicitly illustrated or described, but are implied by the illustrated blocks or modules. In one embodiment, the functions illustrated are primarily performed by control logic implemented by software, instructions, or code stored in a computer readable storage medium and executed by a microprocessor-based controller to control operation of the system. While generally illustrated and described with respect to a magnetic tape drive, those of ordinary skill in the art will recognize that various functions may be applicable to various other types of peripheral storage devices The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for error classification in an integration system, the method comprising:
building, within the integration system, an error classifier model, the error classifier model comprising an index of a plurality of error classifications, wherein each error classification comprises plain text;
receiving a request to begin a transaction at the integration system;
invoking an application associated with the request;
in response to invoking the application, receiving a layered error notification, the layered error notification comprising at least two error notifications, a first error notification of the at least two error notifications comprising a first error format of a plurality of error formats, and a second error notification being layered behind the first error notification, the second error notification comprising a second error format of the plurality of error formats, the second error format being different than the first error format;
extracting an error message text from the layered error notification, the error message text representing both the first error notification of the first error format and the second error notification of the second error format, resulting in a plain text of the layered error notification;
classifying, at an error classifier, the layered error notification to one of a recoverable error or a non-recoverable error based at least on training data at the error classifier model and a comparison of the plain text of the layered error notification with the plain text of the plurality of error classifications;

upon the classification of the layered error notification being a recoverable error, re-trying, at the integration system, a first process that resulted in the layered error notification; and upon the classification of the layered error notification being a non-recoverable error, interrupting a second process that resulted in the layered error notification.

2. The method of claim 1, further comprising:

receiving, at the error classifier model, the training data, wherein the training data comprises an index of errors, the index of errors comprising a list of a plurality of errors corresponding to a list of a plurality of error classifications.

3. The method of claim 2, wherein the error classifications include one or more of the following:

system recoverable errors;
system non-recoverable errors;
application recoverable errors; and
application non-recoverable errors.

4. The method of claim 3, wherein the first error notification indicates a system error and the second error notification indicates an application error.

5. The method of claim 1, further comprising:

after extracting the error message text from the layered error notification, receiving, at the error classifier model, the training data, wherein the training data comprises an administrator error classification, the administrator error classification being associated with the layered error notification.

6. The method of claim 5, wherein the administrator error classification is received by the error classifier model through a dashboard, the dashboard being accessible by an administrator during runtime.

7. The method of claim 6, further comprising:

notifying the administrator that the layered error notification cannot be classified based upon training data received prior to runtime, wherein the training data received prior to runtime comprises an index of errors, the index of errors comprising a list of a plurality of errors corresponding to a list of a plurality of error classifications.

8. A system for error classification in an integration system, the system comprising:

one or more microprocessors; and a processor, running on the one or more microprocessors, wherein the processor operates to perform steps comprising;

building, within the integration system, an error classifier model, the error classifier model comprising an index of a plurality of error classifications, wherein each error classification comprises plain text;

receiving a request to begin a transaction at the integration system;

invoking an application associated with the request;

in response to invoking the application, receiving a layered error notification, the layered error notification comprising at least two error notifications, a first error notification of the at least two error notifications comprising a first error format of a plurality of error formats, and a second error notification being layered behind the first error notification, the second error notification comprising a second error format of the plurality of error formats, the second error format being different than the first error format;

extracting an error message text from the layered error notification, the error message text representing both the first error notification of the first error format and the second error notification of the second error format, resulting in a plain text of the layered error notification;

classifying, at an error classifier, the layered error notification to one of a recoverable error or a non-recoverable error based at least on training data at the error classifier model and a comparison of the plain text of the layered error notification with the plain text of the plurality of error classifications;

upon the classification of the layered error notification being a recoverable error, re-trying, at the integration system, a first process that resulted in the layered error notification; and upon the classification of the layered error notification being a non-recoverable error, interrupting a second process that resulted in the layered error notification.

9. The system of claim 8, wherein the processor operates to perform further steps comprising:

receiving, at the error classifier model, the training data, wherein the training data comprises an index of errors, the index of errors comprising a list of a plurality of errors corresponding to a list of a plurality of error classifications.

10. The system of claim 9, wherein the error classifications include one or more of the following:

system recoverable errors;
system non-recoverable errors;
application recoverable errors; and
application non-recoverable errors.

11. The system of claim 10, wherein the first error notification indicates a system error and the second error notification indicates an application error.

12. The system of claim 8, wherein the processor operates to perform further steps comprising:

after extracting the error message text from the layered error notification, receiving, at the error classifier model, the training data, wherein the training data comprises an administrator error classification, the administrator error classification being associated with the layered error notification.

13. The system of claim 12, wherein the administrator error classification is received by the error classifier model through a dashboard, the dashboard being accessible by an administrator during runtime.

14. The system of claim 13, wherein the processor operates to perform further steps comprising:

notifying the administrator that the layered error notification cannot be classified based upon training data received prior to runtime, wherein the training data received prior to runtime comprises an index of errors, the index of errors comprising a list of a plurality of errors corresponding to a list of a plurality of error classifications.

15. A non-transitory machine readable storage medium having instructions stored thereon for supporting error classification in an integration system that, when executed, cause a system to perform steps comprising:

building, within the integration system, an error classifier model, the error classifier model comprising an index of a plurality of error classifications, wherein each error classification comprises plain text;

receiving a request to begin a transaction at the integration system;

invoking an application associated with the request;

in response to invoking the application, receiving a layered error notification, the layered error notification comprising at least two error notifications, a first error notification of the at least two error notifications comprising a first error format of a plurality of error formats, and a second error notification being layered behind the first error notification, the second error notification comprising a second error format of the plurality of error formats, the second error format being different than the first error format;

extracting an error message text from the layered error notification, the error message text representing both the first error notification of the first error format and the second error notification of the second error format, resulting in a plain text of the layered error notification; and classifying, at an error classifier, the layered error notification to one of a recoverable error or a non-recoverable error based at least on training data at the error classifier model and a comparison of the plain text of the layered error notification with the plain text of the plurality of error classifications;

upon the classification of the layered error notification being a recoverable error, re-trying, at the integration system, a first process that resulted in the layered error notification; and upon the classification of the layered error notification being a non-recoverable error, interrupting a second process that resulted in the layered error notification.

16. The non-transitory machine readable storage medium of claim 15 having instructions thereon that when executed cause a system to perform further steps comprising:

receiving, at the error classifier model, the training data, wherein the training data comprises an index of errors, the index of errors comprising a list of a plurality of errors corresponding to a list of a plurality of error classifications.

17. The non-transitory machine readable storage medium of claim 16, wherein the error classifications include one or more of the following:
  system recoverable errors;
  system non-recoverable errors;
  application recoverable errors; and
  application non-recoverable errors.

18. The non-transitory machine readable storage medium of claim 15 having instructions thereon that when executed cause a system to perform further steps comprising:

after extracting the error message text from the layered error notification, receiving, at the error classifier model, the training data, wherein the training data comprises an administrator error classification, the administrator error classification being associated with the layered error notification.

19. The non-transitory machine readable storage medium of claim 15, wherein the administrator error classification is received by the error classifier model through a dashboard, the dashboard being accessible by an administrator during runtime.

20. The non-transitory machine readable storage medium of claim 19 having instructions thereon that when executed cause a system to perform further steps comprising notifying the administrator that the error notification cannot be classified based upon training data received prior to runtime, wherein the training data received prior to runtime comprises an index of errors, the index of errors comprising a list of a plurality of errors corresponding to a list of a plurality of error classifications.

* * * * *

UNITED STATES PATENT AND TRADEMARK OFFICE
CERTIFICATE OF CORRECTION

PATENT NO. : 10,108,473 B2  
APPLICATION NO. : 14/743492  
DATED : October 23, 2018  
INVENTOR(S) : Jhunjhunwala et al.

Page 1 of 1

It is certified that error appears in the above-identified patent and that said Letters Patent is hereby corrected as shown below:

In the Specification

In Column 9, Line 66, after "devices" insert -- . --.

Signed and Sealed this
Thirty-first Day of December, 2019

Andrei Iancu
*Director of the United States Patent and Trademark Office*